United States Patent
Guo et al.

(10) Patent No.: US 10,461,556 B2
(45) Date of Patent: Oct. 29, 2019

(54) CHARGER, ELECTRONIC DEVICE, AND CHARGING METHOD

(71) Applicant: SHENZHEN ROYOLE TECHNOLOGIES CO. LTD., Shenzhen, Guangdong (CN)

(72) Inventors: Jilong Guo, Guangdong (CN); Zengyuan Chen, Guangdong (CN); Bihua Yang, Guangdong (CN)

(73) Assignee: SHENZHEN ROYOLE TECHNOLOGIES CO, LTD., Shenzhen (CN)

( * ) Notice: Subject to any disclaimer, the term of this patent is extended or adjusted under 35 U.S.C. 154(b) by 131 days.

(21) Appl. No.: 15/680,340

(22) Filed: Aug. 18, 2017

(65) Prior Publication Data
US 2018/0054074 A1    Feb. 22, 2018

(51) Int. Cl.
*H02J 7/00*    (2006.01)

(52) U.S. Cl.
CPC ..... *H02J 7/0052* (2013.01); *H02J 2007/0001* (2013.01); *H02J 2007/0062* (2013.01); *H02J 2007/0096* (2013.01)

(58) Field of Classification Search
CPC ............. H02J 7/0052; H02J 2007/0001; H02J 2007/0062; H02J 2007/0096
USPC ......................................................... 320/114
See application file for complete search history.

(56) References Cited

U.S. PATENT DOCUMENTS

| 2011/0016341 A1 | 1/2011 | Tom et al. |
| 2013/0113417 A1 | 5/2013 | Nakashima |
| 2016/0004650 A1 | 1/2016 | Yamasaki et al. |

FOREIGN PATENT DOCUMENTS

| CA | 2951176 | 5/2016 | |
| CN | 102393837 | 3/2012 | |
| CN | 102684270 | 9/2012 | |
| CN | 105022468 | * 4/2014 | ............... G06F 1/26 |
| CN | 203747451 | 7/2014 | |
| CN | 104124732 | 10/2014 | |
| CN | 104300628 | 1/2015 | |
| CN | 104506055 | 4/2015 | |
| CN | 105022468 | 11/2015 | |
| CN | 106058983 | 10/2016 | |
| WO | 2016008123 | 1/2016 | |
| WO | 2016074158 | 5/2016 | |

* cited by examiner

*Primary Examiner* — Edward Tso
*Assistant Examiner* — Ahmed H Omar
(74) *Attorney, Agent, or Firm* — Hauptman Ham, LLP

(57) ABSTRACT

The disclosure provides a charging method, the method includes the following steps: initiating a handshake between an electronic device and a charger when the electronic device is connected to the charger via a charge cable. After the handshake between the electronic device and the charger is created successfully, controlling a first data pin of a power port of the electronic device to connect to a first power pin of the power port and controlling a second data pin of the power port to connect to a first ground pin of the power port. In additional, controlling a third data pin of a charge port of the charger to connect to a second power pin of the charge port and controlling a fourth data pin of the charge port to connect to a second ground pin of the charge port. The disclosure further provides the charger and the electronic device.

22 Claims, 5 Drawing Sheets

CHARGER, ELECTRONIC DEVICE, AND CHARGING METHOD

CROSS REFERENCE TO RELATED APPLICATIONS

This application claims priority to PCT Patent Application No. PCT/CN2016/096043, filed on Aug. 19, 2016, and PCT Patent Application No. PCT/CN2016/106600, filed on Nov. 21, 2016, the content of which are hereby incorporated by reference in their entirety.

TECHNICAL FIELD

This disclosure relates to an electronic device, and more particularly relates to an electronic device with a rechargeable battery, a charger to charge the electronic device, and a charging method thereof.

BACKGROUND

Nowadays, smart phones are popular. Due to the smart phone is used frequently, the power consume of the smart phone is largely and the smart phone needs to be charged frequently. Now, the capacity of the battery of the smart phone becomes larger, which causes the charging time to charge the battery becomes longer, how to quickly charge the battery is a problem needed to be resolved.

In general technology, there are two charging methods to achieve fast charge, one method is enhancing the charge voltage output by a charger for charging the smart phone, another method is enhancing the charge current output by the charger. However, the method for enhancing the charge voltage and the method for enhancing the charge current cannot be applied at the same time, thus limiting the charge speed. Besides, when choosing the method for enhancing the charge current, charge ports or charge lines of the smart phone and the charger should be particular ports or particular charge lines, which increases the costing and leads the charger cannot be used to other unmatched smart phones, or the smart phone cannot be charged by other unmatched chargers.

SUMMARY

Embodiments of the disclosure provide a charger, an electronic device, and a charging, to enhance charge speed by using normal charge ports and a normal charge cable.

The disclosure provides a charger that comprises: a charge port, a controller, and a connection switching circuit. The charge port comprises a power pin, a first data pin, a second data pin, and a ground pin, the first data pin is disconnected to the second data pin, the charge port is configured to connect to an electronic device. The controller is connected to the first data pin and the second data pin. The connection switching circuit is connected to the power pin, the first data pin, the second data pin, and the ground pin, and the controller. Therein, the controller is configured to control the connection switching circuit to connect the first data pin to the power pin and connect the second data pin to the ground pin, when a handshake between the charger and the electronic device connected to the charge port is created successfully.

The disclosure further provides an electronic device that comprises a power port, a processor, and a connection switching circuit. The power port comprises a power pin, a first data pin, a second data pin, and a ground pin, the first data pin is disconnected to the second data pin, the power port is configured to connect to a charger. The processor is connected to the first data pin and the second data pin. The connection switching circuit is connected to the power pin, the first data pin, the second data pin, and the ground pin, and the processor. Therein, the processor is configured to initiate a handshake between the electronic device and the charger when the power port connects to the a charge port of the charger, and control the connection switching circuit to connect the first data pin to the power pin and connect the second data pin to the ground pin when the handshake between the electronic device and the charger is created successfully.

The disclosure further provides a charging method for charging an electronic device by using a charger, the charging method comprise: initiating a handshake between the electronic device and the charger when the electronic device is connected to the charger via a charge cable; controlling a first data pin of a power port of the electronic device to connect to a first power pin of the power port of the electronic device and controlling a second data pin of the power port of the electronic device to connect to a first ground pin of the power port of the electronic device after the handshake between the electronic device and the charger is created successfully; and controlling a third data pin of a charge port of the charger to connect to a second power pin of the charge port of the charger and controlling a fourth data pin of the charge port of the charger to connect to a second ground pin of the charge port of the charger after the handshake between the electronic device and the charger is created successfully, wherein the third data pin is always disconnected to the fourth data pin.

According to the charger, electronic device, and charging method provided by embodiments of the disclosure, by using a normal charge cable, the charge speed can be enhanced through making the power pin of the charge port of the charger and the first data pin of the charge port of the charger to be short circuited, and making the ground pin of the charge port of the charger and the second data pin of the charge port of the charger to be short circuited. Furthermore, the through enhancing the power output to the power pin and the first data pin which are short circuited, and the ground pin and the second data pin which are short circuited, the charge speed would be further enhance, and the charge time become more shorter.

BRIEF DESCRIPTION OF THE ACCOMPANYING DRAWINGS

The foregoing and other objects, features and advantages of the disclosure will be apparent from the following more particular description of preferred embodiments of the disclosure, as illustrated in the accompanying drawings in which like reference characters refer to the same parts throughout the different views. The drawings are not necessarily to scale, emphasis instead being placed upon illustrating the principles of the invention.

DETAILED DESCRIPTION OF ILLUSTRATED EMBODIMENTS

The present disclosure will now be described in detail and completely with reference to the accompanying drawings of the embodiments, in which the objects, solutions, and advantages of the disclosure will become more apparent. It is to be understood that the specific embodiments described herein are merely illustrative of the disclosure and are not intended to limit the disclosure. Any variations or substitutions that can be easily thought out by a person skilled in the art would be within the scope of the disclosure and shall all be covered within the protection of the disclosure. In the disclosure, words "connect"/"connection" can include directly or indirectly connect/connection, and particularly, the words "connect"/"connection" mean electrical connect/connection.

Figure 1:
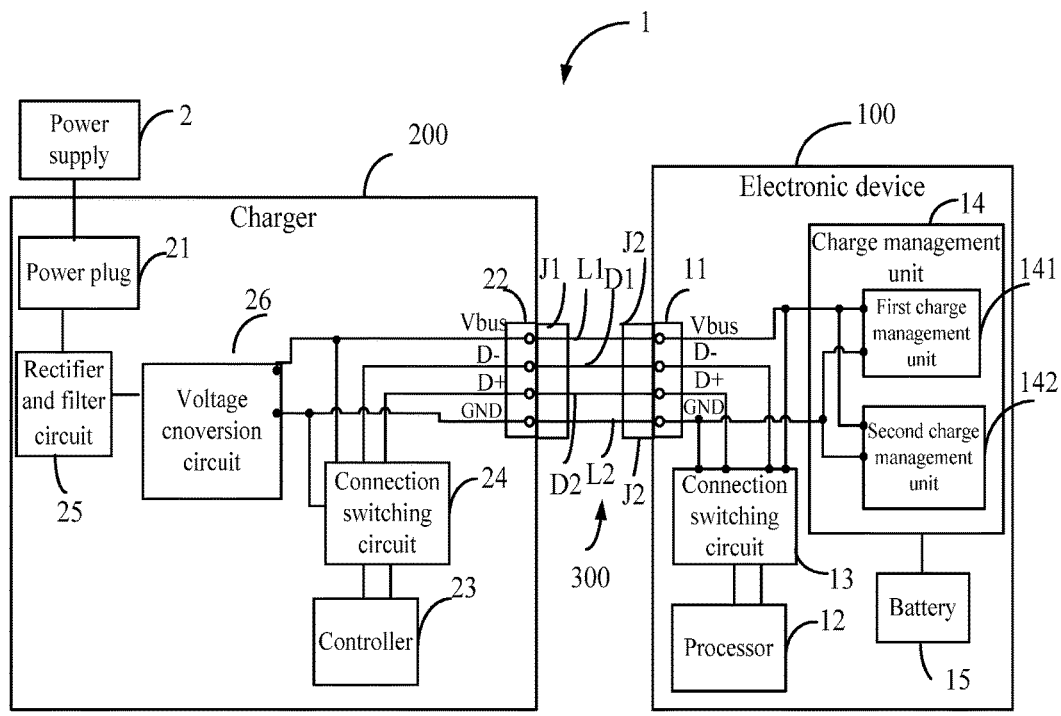
FIG. 1 is a block diagram of a charge system comprising an electronic device and a charger, according to one embodiment of the disclosure.

Referring to FIG. 1, a block diagram of a charge system 1 is illustrated. The charge system 1 includes an electronic device 100, a charger 200, and a charge cable 300. The charger 200 is used to charge the electronic device 100 via the charge cable 300. In another embodiment, the charger 200 can connect to the electronic device 100 directly and charge the electronic device 100 directly.

As shown in FIG. 1, the electronic device 100 includes a power port 11, a processor 12, a connection switching circuit 13, a charge management unit 14, and a battery 15. The battery 15 is a rechargeable battery. The charger 200 includes a power plug 21, a charge port 22, a controller 23, and a connection switching circuit 24.

The power plug 21 of the charger 200 is used to be plugged into a power supply 2, such as an alternating current main supply. The power port 11 of the electronic device 100 is used to connect to the charge port 22 of the charger 200 via the charge cable 300.

As shown in FIG. 1, the power port 11 of the electronic device 100 and the charge port 22 of the charger 200 both are universal serial bus (USB) ports, each of them includes a power pin Vbus, a first data pin D−, a second data pin D+, and a ground pin GND. The charge cable 300 includes a power line L1, a ground line L2, and two data lines D1, D2. When the power port 11 of the electronic device 100 connects to the charge port 22 of the charger 200 via the charge cable 300, the power line of the charge cable 300 is connected to the power pins Vbus of the power port 11 and the charge port 22; the ground line L2 of the charge cable 300 is connected to the ground pins GND of the power port 11 and the charge port 22; the data lines D1 of the charge cable 300 is connected to the first data pins D− of the power port 11 and the charge port 22; and the data line D2 of the charge cable 300 is connected to the second data pins D+ of the power port 11 and the charge port 22.

The connection switching circuit 13 of the electronic device 100 is connected between the processor 12 and the power pin Vbus, the first data pin D−, the second data pin D+, and the ground pin GND of the power port 11. The connection switching circuit 13 connects the first data pin D− and the second data pin D+ of the power port 11 to the processor 12 by default.

The connection switching circuit 24 of the charger 200 is connected between the controller 23 and the power pin Vbus, the first data pin D−, the second data pin D+, and the ground pin GND of the charge port 22. The connection switching circuit 24 connects the first data pin D− and the second data pin D+ of the charge port 22 to the controller 23 by default.

The processor 12 of the electronic device 100 is used to initiate a handshake between the processor and the controller 23 of the charger 200, after the power port 11 of the electronic device 100 is connected to the charge port 22 of the charger 200. In detail, the processor 12 initiates the handshake between the processor 12 and the controller 23 via the first data pins D−, the second data pins D+ of the power port 11 and the first data pins D−, the second data pins D+ of the charge port 22.

After the handshake between the processor 12 and the controller 23 is created, the processor 12 controls the connection switching circuit 13 to switch the first data pin D− and the second data pin D+ of the power port 11 to connect with the power pin Vbus and the ground pin GND of the power port 11 respectively. Namely, the processor 12 controls the connection switching circuit 13 to connect the first data pin D− of the power port 11 to the power pin Vbus of the power port 11, and connect the second data pin D+ of the power port 11 to the ground pin GND of the power port 11. Obviously, in another embodiment, the processor 12 also can control the connection switching circuit 13 to connect the second data pin D+ of the power port 11 to the power pin Vbus of the power port 11, and connect the first data pin D− of the power port 11 to the ground pin GND of the power port 11. That is, the processor 12 controls the connection switching circuit 13 to connect one of the two data pins of the power port 11 to the power pin Vbus of the power port 11, and to connect another of the two data pins of the power port 11 to the ground pin GND of the power port 11, no matter which data pin is connected to the power pin Vbus or the ground pin GND. In the disclosure, the first data pin D− and the second data pin D+ just are different names to distinguish the two data pins of the power port 11.

After the handshake between the processor 12 and the controller 23 is created, the controller 23 also controls the connection switching circuit 24 to switch the first data pin D− and the second data pin D+ of the charge port 22 to connect with the power pin Vbus and the ground pin GND of the charge port 22 respectively. Namely, the controller 23 controls the connection switching circuit 24 to connect the first data pin D− of the charge port 22 to the power pin Vbus of the charge port 22, and connect the second data pin D+ of the charge port 22 to the ground pin GND of the charge port 22. Correspondingly, in another embodiment, when the second data pin D+ of the power port 11 is connected to the power pin Vbus of the power port 11 and the first data pin D− of the power port 11 is connected to the ground pin GND of the power port 11, the controller 23 correspondingly controls the connection switching circuit 24 to connect the second data pin D+ of the charge port 22 to the power pin Vbus of the charge port 22, and connect the first data pin D− of the charge port 22 to the ground pin GND of the charge port 22. That is, under the condition of keeping the same connection relationships as the power port 11, the controller 12 controls the connection switching circuit 13 to connect one of the two data pins of the charge port 22 to the power pin Vbus of the charge port 22, and to connect another of the two data pins of the charge port 22 to the ground pin GND of the charge port 22.

Figure 2:
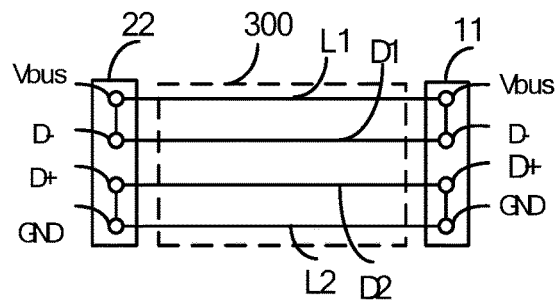
FIG. 2 is schematic diagram of a state of a charge cable when a handshake of an electronic device and a charger is created, according to one embodiment of the disclosure.

Referring to FIG. 2 together, therefore, when the handshake between the processor 12 of the electronic device 100 and the controller 23 of the charger 200 is created, the data line D1 and the power line L1 of the charge cable 300 is short circuited, and the data line D2 and the ground line L2 of the charge cable 300 is also short circuited. Thus, the lines of the power cable 300 used to transmit charge current are increased, namely, the data line D1 and the power line L1 are used as one line with a function of the power line L1, the data line D2 and the ground line L2 are combined as one line with a function of the ground line L2. At this situation, the resistance value of the charge cable 300 would be decreased to a half of an original value. Therefore, the charge current flowing through the charge cable 300 would be increased, such as doubled, at the same charge voltage, the charge speed for charging the electronic device would be enhanced greatly without need a particular charge cable and a particular charge port.

Furthermore, due to the lines used to transmit the charge current are increased, the heat emitted by the charge cable 300 would be decreased while the charge speed is enhanced.

As shown in FIG. 1, the charge cable 300 further includes two charge plug J1, J2. The charge cable 300 connects to the charge port 22 of the charger 200 via the charge plug J1, and connects to the power port 11 of the electronic device 100 via the charge plug J2. In some embodiments, the charge cable 300 can be a USB charge cable, the charge plug J1 can be a USB plug, and the charge port 22 of the charger 200 can be a USB port to receive the charge plug J1, the charge plug J2 can be a mini-USB plug, the power port 11 of the electronic device 100 can be a mini-USB port to receive the charge plug J2.

The charge management unit 14 is connected to the power port 11 of the electronic device 100, and is used to receive power energy provided by the charger 200 from the power port 11, and convert the power energy to a suitable charge voltage or a suitable charge current to charge the battery 15.

As illustrated in FIG. 1, the charge management unit 14 includes a first charge management unit 141 and a second charge management unit 142. The first charge management unit 141 and the second charge management unit 142 are both connected to the power pin Vbus and the ground pin GND of the power port 11. Input current of the charge management unit 14, received from the power pin Vbus and/or the ground pin GND of the power port 11 are shunted to two shunt current, and the two shunt current are respectively transmitted to the first charge management unit 141 and the second charge management unit 142. Due to the input current is divided to two shunt current less than an original charge current, such as, the two shunt current both are a half of the charge current received from the power pin Vbus and the ground pin GND, therefore, the shunt current flowing through each of the first charge management unit 141 and the second charge management unit 142 would be less than the charge current. Even though the input current received from the power port 11 is increased due to the resistance value of the charge cable 300 is decreased, the current flowing through the first charge management unit 141 and the second charge management unit 142 can be maintained to a preset value or lower than the preset value, thus preventing the charge management unit 14 from overheating effectively.

The first charge management unit 141 and the second charge management unit 142 both are further connected to the battery 15, output current I1, I2 that output from the first charge management unit 141 and the second charge management unit 142 are combined into a joint current Ic to charge the battery 15. Therefore, the battery 15 is also charged by a larger current when the charge current transmitted by the charge cable 300 is increased, thus achieving fast charge effect.

As shown in FIG. 1, the charger 200 further includes a rectifier and filter circuit 25 and a voltage conversion circuit 26. The rectifier and filter circuit 25 is connected between the power plug 21 and the voltage conversion circuit 26, the voltage conversion circuit 26 is further connected to the charge port 22. The rectifier and filter circuit 25 is used to rectify and filter a voltage or a current with alternating current form received by the power plug 11, thus to convert the voltage or the current with alternating current form to a voltage or a current with direct current form. The voltage conversion circuit 26 is used to convert the voltage or the current output by the rectifier and filter circuit 25 to a suitable charge voltage or a suitable charge current, and output the suitable charge voltage or the suitable charge current via the charge port 22.

Figure 3:
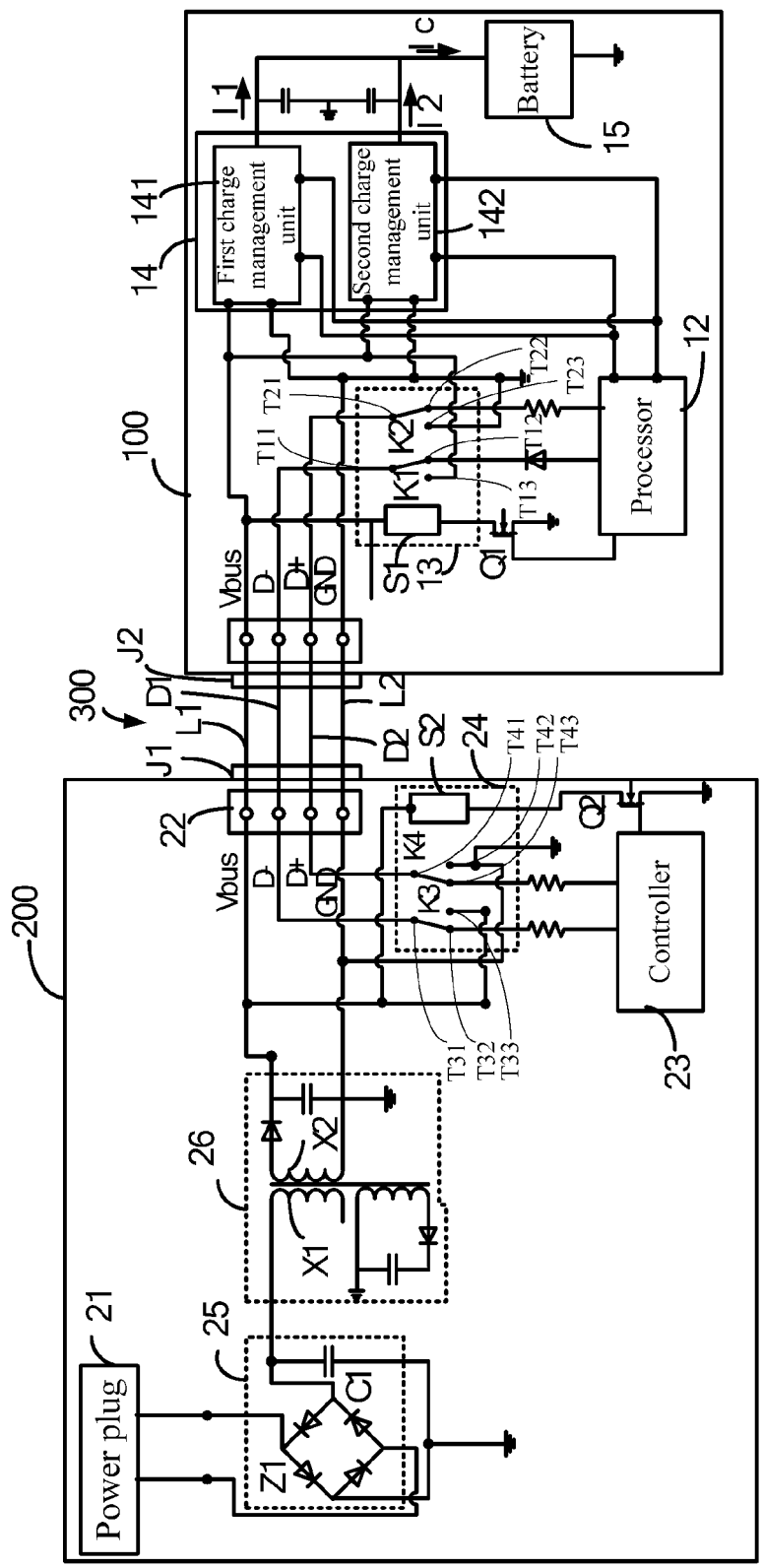
FIG. 3 is circuit diagram of a charge system, according to one embodiment of the disclosure.

Referring also to FIG. 3, a detail circuit of the charge system 1 is shown. As illustrated in FIG. 3, the connection switching circuit 13 is a double-pole double-throw relay, the connection switching circuit 13 includes switches K1, K2, and an enable port S1. A common terminal T11 of the switch K1 is connected to the first data pin D− of the power port 11, a normally closed terminal T12 of the switch K1 is connected to the processor 12, and a normally open terminal T13 of the switch K1 is connected to the power pin Vbus of the power port 11. A common terminal T21 of the switch K2 is connected to the second data pin D+ of the power port 11, a normally closed terminal T22 of the switch K2 is connected to the processor 12, and a normally open terminal T23 of the switch K2 is connected to the ground pin GND of the power port 11.

In a normal state, the common terminals T11, T21 of the switches K1, K2 are respectively connected to the normally closed terminals T12, T22 of the switches K1, K2, thus causing the first data pin D− and the second data pin D+ of the power port 11 both are connected to the processor 12. Namely, the common terminal T11 is connected to the normally closed terminal T12 of the switch K1, and the common terminal T21 is connected to the normally closed terminal T22 of the switch K2 by default, and the first data pin D− and the second data pin D+ of the power port 11 are disconnected.

The enable port S1 is connected between the power pin Vbus of the power port 11 and a grounded switch Q1. The processor 12 is further connected to the grounded switch Q1.

As illustrated in FIG. 3, the connection switching circuit 24 of the charger 200 is also a double-pole double-throw relay, the connection switching circuit 24 includes switches K3, K4, and an enable port S2. A common terminal T31 of the switch K3 is connected to the first data pin D− of the charge port 22, a normally closed terminal T32 of the switch K3 is connected to the controller 23, and a normally open terminal T33 of the switch K3 is connected to the power pin Vbus of the charge port 22. A common terminal T41 of the switch K4 is connected to the second data pin D+ of the charge port 22, a normally closed terminal T42 of the switch K4 is connected to the controller 23, and a normally open terminal T43 of the switch K4 is connected to the ground pin GND of the charge port 22.

In a normal state, the common terminals T31, T41 of the switches K3, K4 are respectively connected to the normally closed terminals T32, T42 of the switches K3, K4, thus causing the first data pin D− and the second data pin D+ of the charge port 22 both are connected to the controller 23. Namely, the common terminal T31 is connected to the normally closed terminal T32 of the switch K3, and the common terminal T41 is connected to the normally closed terminal T42 of the switch 42 by default, and the first data pin D− and the second data pin D+ of the charge port 22 of the charger are disconnected, which is different from the known technology.

The enable port S2 is connected between the power pin Vbus of the charge port 22 and a grounded switch Q2. The controller 23 is further connected to the grounded switch Q2.

After the electronic device 100 and the charger 200 are connected to each other via the charge cable 300, the first data pin D− and the second data pin D+ of the power port 11 are respectively connected to the first data pin D− and the second data pin D+ of the charge port 22 via the data lines D1, D2 of the charge cable 300. Thus, the processor 12 of the electronic device 100 is connected to the first data pin D− and the second data pin D+ of the charge port 22 via the first data pin D− and the second data pin D+ of the power port 11, and is further connected to the controller 23 via the first data pin D− and the second data pin D+ of the charge port 22. At this condition, the processor 12 of the electronic device 100 can communicate with the controller 23 of the charger 200 to create handshake, via the data lines D1, D2 of the charge cable 300.

When the processor 12 of the electronic device 100 determines the handshake between the processor 12 and the controller 23 is created successfully, the processor 12 outputs a signal (such as an "on" signal) to the grounded switch Q1 to turn on the grounded switch Q1. Therefore, a circuit branch where the enable port S1 locates is turned on and generates a current flowing through the enable port S1, thus triggering the common terminal T11 of the switch K1 to connect to the normally open terminal T13 of the switch K1, and triggering the common terminal T21 of the switch K2 to connect to the normally open terminal T23 of the switch K2. Therefore, the first data pin D− of the power port 11 is connected to the power pin Vbus of the power port 11 due to the common terminal T11 of the switch K1 is connected to the normally open terminal T13 of the switch K1. At the same time, the second data pin D+ of the power port 11 is connected to the ground pin GND of the power port 11 due to the common terminal T21 of the switch K1 is connected to the normally open terminal T23 of the switch K1.

That is, at this time, the first data pin D− of the power port 11 is connected to the power pin Vbus of the power port 11 and the second data pin D+ of the power port 11 is connected to the ground pin GND of the power port 11.

When the handshake between the processor 12 and the controller 23 is created successfully, the controller 23 outputs a signal (such as an "on" signal) to the grounded switch Q2 to turn on the grounded switch Q2. Therefore, a circuit branch where the enable port S2 locates is turned on and generates a current flowing through the enable port S2, thus triggering the common terminal T31 of the switch K3 to connect to the normally open terminal T33 of the switch K3, and triggering the common terminal T41 of the switch K4 to connect to the normally open terminal T43 of the switch K4. Therefore, the first data pin D− of the charge port 22 is connected to the power pin Vbus of the charge port 22 due to the common terminal T31 of the switch K3 is connected to the normally open terminal T33 of the switch K3. At the same time, the second data pin D+ of the charge port 22 is connected to the ground pin GND of the charge port 22 due to the common terminal T41 of the switch K4 is connected to the normally open terminal T43 of the switch K4.

That is, at this time, the first data pin D− of the charge port 22 is connected to the power pin Vbus of the charge port 22 and the second data pin D+ of the charge port 22 is connected to the ground pin GND of the charge port 22.

Therefore, as shown in FIG. 2, two ends of the data line D1 of the charge cable 300 are respectively connected to two ends of the power line L1 of the charge cable 300, due to the first data pin D− and the power pin Vbus of the power port 11 are connected to each other and the first data pin D− and the power pin Vbus of the charge port 22 are connected to each other. Two ends of the data line D2 of the charge cable 300 are respectively connected to two ends of the ground line L1 of the charge cable 300, due to the second data pin D+ and the ground pin GND of the power port 11 are connected to each other and the second data pin D+ and the ground pin GND of the charge port 22 are connected to each other. That is, the data line D1 and the power line L1 of the charge cable 300 are short circuited, and the data line D2 and the ground line L2 of the charge cable 300 are also short circuited.

Therefore, the lines of the power cable 300 used to transmit the charge current are increased, namely, the data line D1 and the power line L1 are used as a more larger power line, the data line D2 and the ground line L2 are combined as a more larger ground line. In other words, the lines used to transmit the charge current become more thicker, and the resistance value of the charge cable 300 is decreased, thus the charge current would be increased under the same charge voltage, which enhances the charge speed. In detail, the number of lines of the power cable 300 used to transmit the charge current increases twice as original number, and the resistance value of the charge cable 300 is decreased to a half of a original resistance value of the charge cable 30, thus the charge current would be increased as twice as before when the charge cable 300 is applied to the same charge voltage, thus the charge speed would be enhanced to twice as before.

In some embodiments of the disclosure, the processor 12 of the electronic device 100 initiates the handshake between the processor 12 of the electronic device 100 and the controller 23 of the charger 300 may include: the processor 12 sends a first preset pulse signal to the controller 23 via the charge cable 300; therein, the controller 23 sends a second preset pulse signal to the processor 12 via the charge cable 300 after receiving the first preset pulse signal.

In one embodiment, the first preset pulse signal is a handshake request signal for requesting the charger 200 to establish handshake, the second preset pulse signal is a handshake confirm signal used to inform the electronic device 100 that the charger 200 agrees to the request.

The processor 12 determines the handshake between the processor 12 and the controller 23 is created successfully when the processor 12 receives the second preset pulse signal, and controls the connection switching circuit 13 to connect the common terminals T11, T21 of the switches K1, K2 to the normally open terminals T13, T23 of the switches K1, K2 respectively, as described above. The controller 23 determines the handshake between the processor 12 and the controller 23 is created successfully when receiving the first preset pulse signal, and sends the second preset pulse signal to the processor 12, and then controls the connection switching circuit 24 to connect the common terminals T31, T41 of the switches K3, K4 to the normally open terminals T33, T43 of the switches K3, K4 respectively, as described above.

Therefore, according to the above controlling, hardware preparation for fast charge is finished.

Obviously, in other embodiments, the controller 23 can send the first preset pulse signal to the processor to initiate the handshake between the processor 12 and the controller 23. That is, in other embodiments, the handshake can be initiated by the controller 23.

In some embodiments, the first preset pulse signal and the second preset pulse signal may be ten continuous pulses, and a cycle of each pulse is 20 milliseconds, a duty ratio of each pulse is 50%.

In another embodiment of the disclosure, the processor 12 of the electronic device 100 initiates the handshake between the processor 12 of the electronic device 100 and the controller 23 of the charger 300 may include: the processor 12 sends a first preset pulse signal to the controller 23 via the charge cable 300, thus to generate a fast charge request to the charger 200. The controller 23 sends a second preset pulse signal to the processor 12 via the charge cable 300 when receiving the first preset pulse signal, thus to inform the processor 12 that the controller 23 has received the first preset pulse signal. Therein, the second preset pulse signal is used to indicate that the charger 200 agrees to the fast charge request, and request the electronic device 100 to do the hardware preparation for the fast charge, such as control the switches K1, K2 to changes their switch state.

The processor 12 determines the handshake between the processor 12 and the controller 23 is created successfully when receiving the second preset pulse signal, and sends a third preset pulse signal to the controller 23 of the charger 200 to request the charger 200 to do the hardware preparation for the fast charge. The processor 12 then controls the common terminals T11, T21 of the switches K1, K2 to connect to the normally open terminals T13, T23 of the switches K1, K2 as described above.

The first preset pulse signal is the handshake request signal for requesting the charger 200 to establish handshake, the second preset pulse signal is a handshake confirm signal used to inform the electronic device 100 that the charger 200 agrees to the request. In one embodiment, the third preset pulse signal is a charge request signal, used to request the charger 200 to prepare charge the electronic device 100.

In the embodiment, the controller 23 determines the handshake between the processor 12 and the controller 23 is created successfully when the controller 23 receives the third preset pulse signal, and controls the connection switching circuit 24 to connect the common terminals T31, T41 of the switches K3, K4 to the normally open terminals T33, T43 of the switches K3, K4 respectively, as described above. Namely, when the controller 23 receives the third preset pulse signal, the controller 23 controls the connection switching circuit 24 to connect the common terminals T31, T41 of the switches K3, K4 to the normally open terminals T33, T43 of the switches K3, K4 respectively, and a charge power output by the charger 200 is enhanced after the common terminals T31, T41 of the switches K3, K4 are connected to the normally open terminals T33, T43 of the switches K3, K4 respectively. Thus, the charger 200 enter a fast charge mode after the common terminals T31, T41 of the switches K3, K4 are respectively connected to the normally open terminals T33, T43 of the switches K3, K4.

In some embodiments, the third preset pulse signal may be five continuous pulses, and a cycle of each pulse is 20 milliseconds, a duty ratio of each pulse is 50%.

In some embodiments, the controller 23 further cuts off the connection between the first data pin D− and the power pin Vbus and cuts off the connection between the second data pin D+ and the ground pin GND, when the charge port 22 and the electronic device 100 is disconnected or the battery 15 of the electronic device 100 is fully charged.

Figure 4:
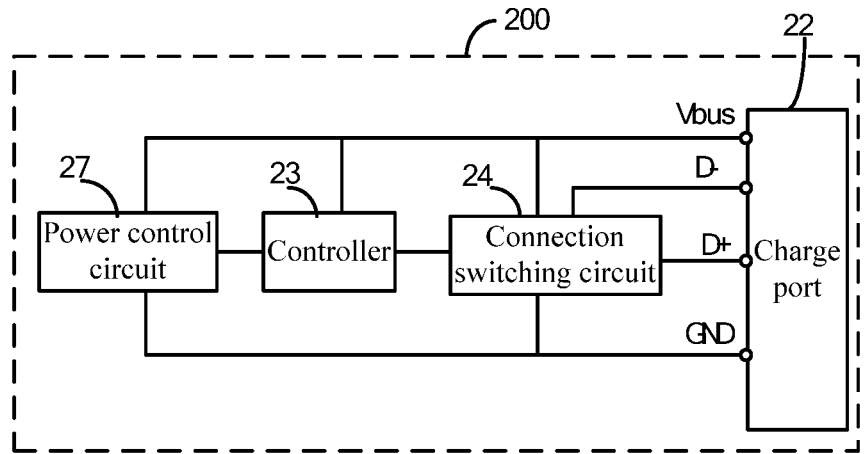
FIG. 4 is a block diagram of a charger, according to another embodiment of the disclosure.

Referring to FIG. 4, a block diagram of the charger 200 is illustrated, according to one embodiment of the disclosure. As shown in FIG. 4, the charger 200 further includes a power control circuit 27, the power control circuit 27 is connected to the controller 23 and is used to control power output to the charge port 22 under the controlling of the controller 23. The power control circuit 27 is further connected to the power pin Vbus and the ground pin GND of the charge port 22. When the handshake between the electronic device 100 and the charger 200 is created successfully, the controller 23 controls the connection switching circuit 24 to connect the first data pin D− of the charge port 22 to the power pin Vbus of the charge port 22, and controls the connection switching circuit 24 to connect the second data pin D+ of the charge port 22 to the ground pin GND of the charge port 22. After the hardware circuit has been switched, the controller 23 controls the power control circuit 27 to enhance the power output to the short-circuited first data pin D− and the power pin Vbus of the charge port 22, and the short-circuited second data pin D+ and the ground pin GND of the charge port 22, thus the power output by the charge port 22 is enhanced accordingly.

In an alternative embodiment, when the handshake between the electronic device 100 and the charger 200 is created successfully, the controller 23 controls the power control circuit 27 to enhance current output to the short-circuited first data pin D− and the power pin Vbus of the charge port 22. Therein, after the handshake between the electronic device 100 and the charger 200 is created successfully, if each pin of the charge port 22 can pass through a current with 1.8 ampere (A), then the controller 23 controls the power control circuit 27 to enhance the current flowing through the short-circuited first data pin D− and the power pin Vbus to a value larger than 1.8A, and the current flowing through the short-circuited second data pin D+ and the ground pin GND is also enhanced to a value larger than 1.8A. For example, the controller 23 controls the power control circuit 27 to output the current with 1.8A to each of the first data pin D− and the power pin Vbus, thus the value of the current output to the short-circuited first data pin D− and the power pin Vbus are combined to 3.6A; the combined current flows back to the second data pin D+ and the ground pin GND which are short circuited, thus the value of the current flowing through the short-circuited second data pin D+ and the ground pin GND are also combined to 3.6A. If each pin of the charge port 22 can pass through a current with 2A, after the handshake between the electronic device 100 and the charger 200 is created successfully, the controller 23 may control the power control circuit 27 to output the current with 2A to each of the first data pin D− and the power pin Vbus, thus the value of the current output to the short-circuited first data pin D− and the power pin Vbus are combined to 4A.

Therein, if creating the handshake between the electronic device 100 and the charger 200 is failed, the charger 200 maintains at an initial charge state, namely the first data pin D− and the power pin Vbus is not short circuited, and the second data pin D+ and the ground pin GND is also not short circuited. A largest current output to the power pin Vbus and the ground pin GND are maintained to 1.8A. Of course, if the conductivity of the pins of the charge port 22 are good, the largest current output to the power pin Vbus and the ground pin GND may reach to 2A.

In an alternative embodiment, when the handshake between the electronic device 100 and the charger 200 is created successfully, the controller 23 controls the power control circuit 27 to enhance voltages output to the short-circuited first data pin D− and the power pin Vbus of the charge port 22. Therein, after the handshake between the electronic device 100 and the charger 200 is created successfully, if each pin of the charge port 22 are designed to apply a standard voltage 3.8 volt (V), then the controller 23 controls the power control circuit 27 to enhance the voltage applied to the short-circuited first data pin D− and the power pin Vbus to a value larger than 3.8V. For example, the controller 23 controls the power control circuit 27 to apply a voltage with a value from 3.8V to 20V to the short-circuited first data pin D− and the power pin Vbus. Therefore, the short-circuited first data pin D− and the power pin Vbus of the charge port 22 can output the voltage with the value from 3.8V to 20V.

Therein, if creating the handshake between the electronic device 100 and the charger 200 is failed, the charger 200 maintains at an initial charge state, namely the first data pin D− and the power pin Vbus is not short circuited, and the second data pin D+ and the ground pin GND is also not short circuited, the voltage output by the power pin Vbus is maintained to 3.8V.

In an alternative embodiment, when the handshake between the electronic device 100 and the charger 200 is created successfully, the controller 23 controls the power control circuit 27 to enhance the current output to the short-circuited first data pin D− and the power pin Vbus of the charge port 22, and the short-circuited second data pin D+ and the ground pin GND of the charge port 22, and enhance the voltages output to the short-circuited first data pin D− and the power pin Vbus of the charge port 22 simultaneously. Namely, after the handshake between the electronic device 100 and the charger 200 is created, if the charge port 200 can provide a voltage with 3.8V and a current with 1.8A, then the controller 23 controls the power control circuit 27 to enhance the current output to the short-circuited first data pin D− and the power pin Vbus of the charge port 22, and the short-circuited second data pin D+ and the ground pin GND of the charge port 22 to values larger than 1.8A. The controller 23 also controls power control circuit 27 to enhance the voltages output to the short-circuited first data pin D− and the power pin Vbus of the charge port 22 to values larger than 3.8V.

Therein, the power control circuit 27 can be a power management chip, and is used to provide corresponding current or voltage to the corresponding pins of the charge port under the controlling of the controller 23.

Figure 5:
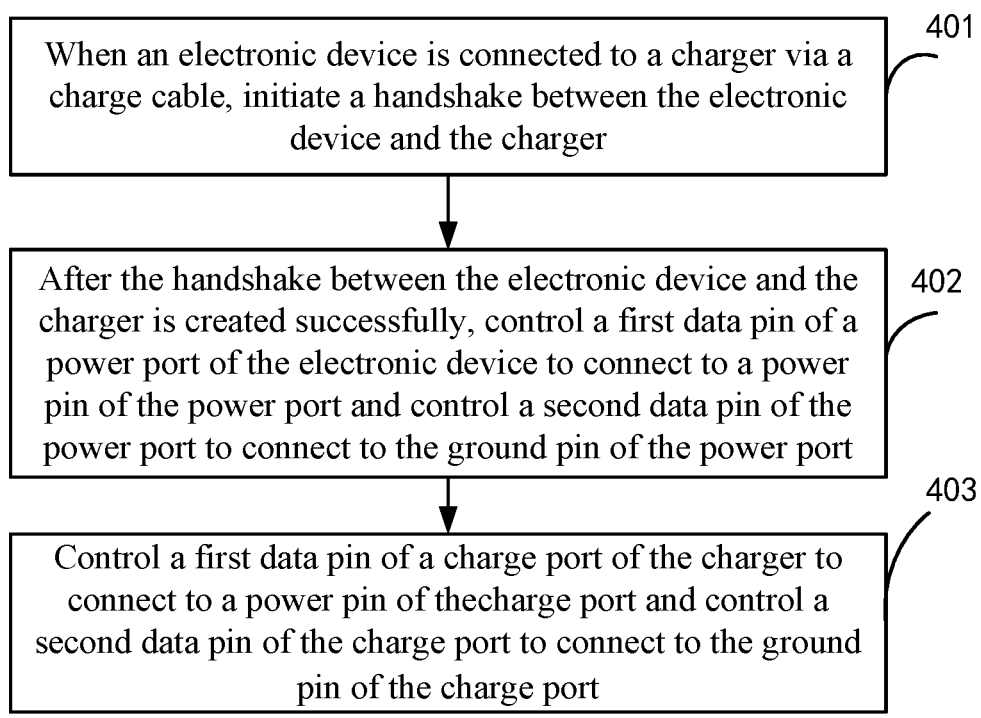
FIG. 5 is a flowchart illustrating a charging method for charging an electronic device, according to a third embodiment of the disclosure.

Referring to FIG. 5, a charging method of one embodiment of the disclosure is illustrated. The charging method is used to control the charger 200 to charge the electronic device 100. The method includes the following steps.

Block 401: when the electronic device 100 is connected to the charger 200 via the charge cable 300, the electronic device 100 initiates a handshake between the electronic device 100 and the charger 200.

Block 402: after the handshake between the electronic device 100 and the charger 200 is created successfully, the electronic device 100 controls the first data pin D− of the power port 11 of the electronic device 100 to connect with the power pin Vbus of the power port 11 of the electronic device 100 and controls the second data pin D+ of the power port 11 of the electronic device 100 to connect with the ground pin GND of the power port 11 of the electronic device 100.

In detail, as shown in FIGS. 1, 3, the electronic device 100 includes a connection switching circuit 13, the connection switching circuit 13 includes the switches K1, K2, and the enable port S1. Initially, the common terminal T11 of the switch K1 is connected to the first data pin D− of the power port 11, the normally closed terminal T12 of the switch K1 is connected to the processor 12, and the normally open terminal T13 of the switch K1 is connected to the power pin Vbus of the power port 11. The common terminal T21 of the switch K2 is connected to the second data pin D+ of the power port 11, the normally closed terminal T22 of the switch K2 is connected to the processor 12, and the normally open terminal T23 of the switch K2 is connected to the ground pin GND of the power port 11. The processor 12 controls the common terminal T11 of the switch K1 to connect to the normally open terminal T13 of the switch K1 to establish an electrical connection between the first data pin D− and the power pin Vbus of the power port 11. The processor 12 of the electronic device 100 controls the common terminal T21 of the switch K2 to connect to the normally open terminal T23 of the switch K2 to establish an electrical connection between the second data pin D+ and the ground pin GND of the power port 11.

Block 403: after the handshake between the electronic device 100 and the charger 200 is created, the charger 200 controls the first data pin D− of the charge port 22 of the charger 200 to connect to the power pin Vbus of the charge port 22 of the charger 200 and controls the second data pin D+ of the charge port 22 of the charger 200 to connect to the ground pin GND of the charge port 22 of the charger 200.

In detail, as shown in FIGS. 1, 3, the charger 200 includes a connection switching circuit 24, the connection switching circuit 24 includes the switches K3, K4, and the enable port S2. Initially, the common terminal T31 of the switch K3 is connected to the first data pin D− of the charge port 22, the normally closed terminal T32 of the switch K3 is connected to the controller 23, and the normally open terminal T33 of the switch K3 is connected to the power pin Vbus of the charge port 22. The common terminal T41 of the switch K4 is connected to the second data pin D+ of the charge port 22, the normally closed terminal T42 of the switch K4 is connected to the controller 23, and the normally open terminal T43 of the switch K4 is connected to the ground pin GND of the charge port 22. The controller 23 of the charger 200 controls the common terminal T31 of the switch K3 to connect to the normally open terminal T33 of the switch K3 to establish an electrical connection between the first data pin D− and the power pin Vbus of the charge port 22. The controller 23 controls the common terminal T41 of the switch K4 to connect to the normally open terminal T43 of the switch K4 to establish an electrical connection between the second data pin D+ and the ground pin GND of the charge port 22.

In one embodiment, after the handshake between the electronic device 100 and the charger 200 is created, the controller 23 of the charger 200 further judges a current Iq of the charger 200 whether is larger than a first preset current value. If yes, namely if the current Iq of the charger 200 is larger than the first preset current value, then the controller 23 controls the first data pin D− of the charge port 22 to connect to the power pin Vbus of the charge port 22, and controls the second data pin D+ of the charge port 22 to connect to the ground pin GND of the charge port 22. That is, in one embodiment, the controller 23 controls the first data pin D− of the charge port 22 to connect to the power pin Vbus of the charge port 22, and controls the second data pin D+ of the charge port 22 to connect to the ground pin GND of the charge port 22, only if the current Iq of the charger 200 is larger than the first preset current value. Therein, the first preset current value is 1A.

Figure 6:
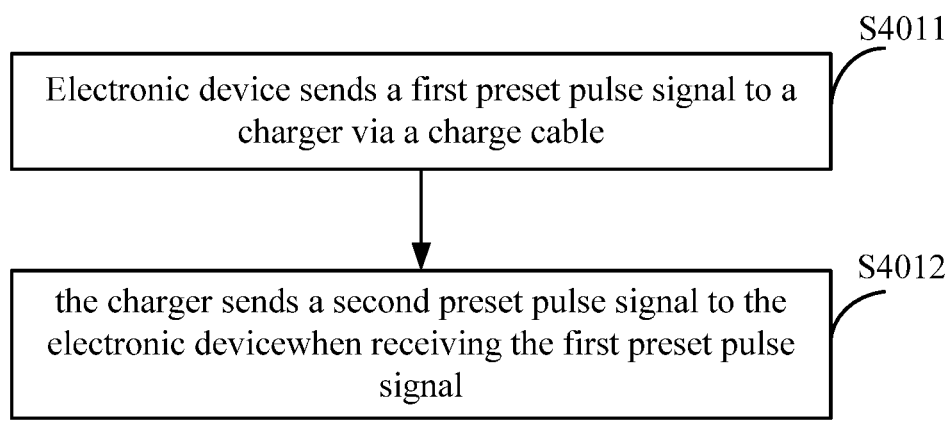
FIG. 6 is a flowchart illustrating a sub-process of block 401 of FIG. 5, according to a first embodiment of the disclosure.

Please referring to FIG. 6, which illustrates a sub-process of the block 401 of FIG. 5, according to one embodiment of the disclosure. As shown in FIG. 6, in one embodiment, the block 401 may include the flowing steps.

Block 4011: the electronic device 100 sends a first preset pulse signal to the charger 200 via the charge cable 300. Therein, the first preset pulse signal is a handshake request signal used to request a handshake for fast charge.

Block 4012: the charger 200 sends a second preset pulse signal to the electronic device 100 to inform the electronic device 100 that the charger 200 has received the first preset pulse signal, and controls the common terminals T31, T41 of the switches K3, K4 of the connection switching circuit 24 to respectively connect to the normally open terminals T33, T43 of the switches K3, K4 of the connection switching circuit 24. That is, the second preset pulse signal is a handshake confirm signal to inform the electronic device 100 that the charger 200 agrees to the request.

Therein, the electronic device 100 determines the handshake between the electronic device 100 and the charger 200 is created successfully when receiving the second preset pulse signal, the electronic device 100 then controls the common terminals T11, T21 of the switches K1, K2 of the connection switching circuit 13 to respectively connect to the normally open terminals T13, T23 of the switches K1, K2 of the connection switching circuit 13.

Figure 7:
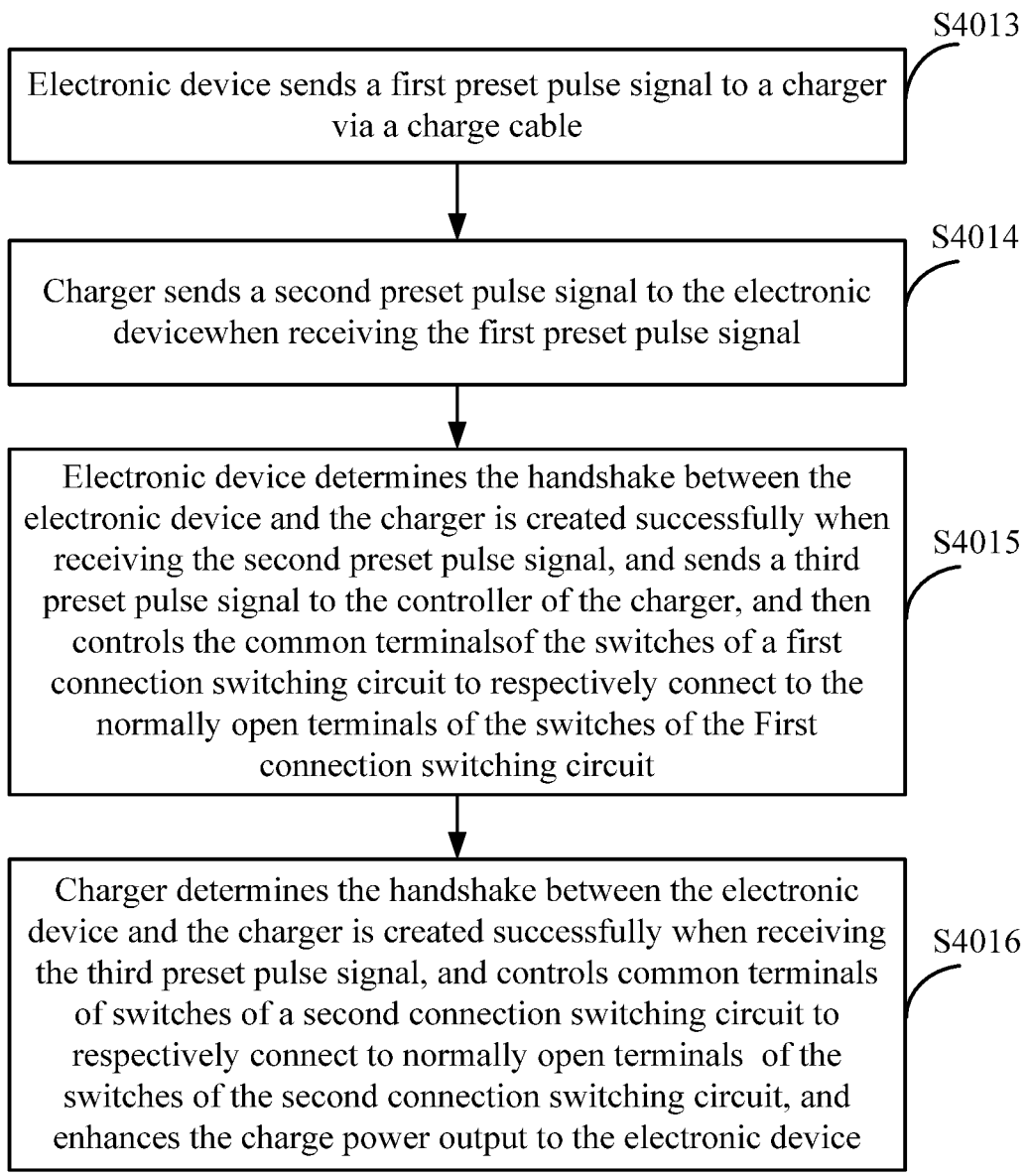
FIG. 7 is a flowchart illustrating a sub-process of block 401 of FIG. 5, according to a second embodiment of the disclosure.

Please referring to FIG. 7, which illustrates a sub-process of the block 401 of FIG. 5, according to another embodiment of the disclosure. As shown in FIG. 7, in another embodiment, the block 401 may include the flowing steps.

Block 4013: the electronic device 100 sends a first preset pulse signal to the charger 200 via the charge cable 300. Therein, the first preset pulse signal is a handshake request signal used to request a handshake for fast charge.

Block 4014: The charger 200 sends a second preset pulse signal to the electronic device 100 to inform the electronic device 100 that the charger 200 has received the first preset pulse signal and request the electronic device 100 to switch a circuit connection to a fast charge circuit connection. That is, the second preset pulse signal is a handshake confirm signal to inform the electronic device 100 that the charger 200 agrees to the request.

Block 4015: the electronic device 100 determines the handshake between the electronic device 100 and the charger 200 is created successfully when receiving the second preset pulse signal, and sends a third preset pulse signal to the controller 23 of the charger 200, and then controls the common terminals T11, T21 of the switches K1, K2 of the connection switching circuit 13 to respectively connect to the normally open terminals T13, T23 of the switches K1, K2 of the connection switching circuit 13.

Block 4016: the charger 200 determines the handshake between the electronic device 100 and the charger 200 is created successfully when receiving the third preset pulse signal, and controls the common terminals T31, T41 of the switches K3, K4 of the connection switching circuit 24 to respectively connect to the normally open terminals T33, T43 of the switches K3, K4 of the connection switching circuit 24, and enhances the charge power output to the electronic device 100. The third preset pulse signal is a charge request signal used to request the charger 200 to prepare charge the electronic device 100.

In detail, the charger 200 may enhance the charge voltage or the charge current provided to the electronic device 100.

The foregoing description merely depicts some exemplary embodiments of the disclosure and thus is not intended as limiting the scope of the disclosure. Any variations or substitutions that can be readily thought of by a person skilled in the art in light of the scope of the disclosure shall all be covered within the protection of the disclosure. Therefore, the scope of the disclosure is defined only by the appended claims.

What is claimed is:

1. A charger, comprising:
   a charge port, comprising a power pin, a first data pin, a second data pin, and a ground pin, the first data pin always being disconnected from the second data pin, the charge port being configured to connect to an electronic device;
   a controller, connected to the first data pin and the second data pin;
   a connection switching circuit, connected to the power pin, the first data pin, the second data pin, and the ground pin, and the controller;
   wherein, the controller is configured to control the connection switching circuit to connect the first data pin to the power pin and connect the second data pin to the ground pin, when a handshake between the charger and the electronic device connected to the charge port is created successfully.

2. The charger according to claim 1, wherein the controller receives a handshake request signal from the electronic device via the first data pin and/or the second data pin, and sends a handshake confirm signal to the electronic device via the first data pin and/or the second data pin in response to the handshake request signal; the controller determines the handshake between the charger and an electronic device is created successfully when receiving the handshake request signal from the electronic device.

3. The charger according to claim 2, wherein the handshake request signal is a first preset pulse signal, and the handshake confirm signal is a second preset pulse signal, wherein the first preset pulse signal and the second preset pulse signal both are ten continuous pulses, and a cycle of each pulse is 20 milliseconds, a duty ratio of each pulse is 50%.

4. The charger according to claim 1, wherein the controller receives a handshake request signal from the electronic device via the first data pin and/or the second data pin, and sends a handshake confirm signal to inform the electronic device the charger received the handshake request signal and request the electronic device to switch a circuit connection to a fast charge circuit connection; the controller determines the handshake between the charger and an electronic device is created successfully when receiving a charge request signal from the electronic device, the charge request signal is send when the electronic device receives the handshake confirm signal from the charger.

5. The charger according to claims 1, wherein the connection switching circuit comprises a first switch and a second switch; each of the first switch and the second switch comprises a common terminal, a normally closed terminal, and a normally open terminal; the common terminal of the first switch is connected to the first data pin of the charge port, the normally closed terminal of the first switch is connected to the controller, and the normally open terminal of the first switch is connected to the power pin of the charge port; the common terminal of the second switch is connected to the second data pin of the charge port, the normally closed terminal of the second switch is connected to the controller, and the normally open terminal of the second switch is connected to the ground pin of the charge port; initially, the common terminals of the first switch and the second switch are respectively connected to the normally closed terminals of the first switch and the second switch; when the handshake between the charger and an electronic device is created successfully, the controller controls the common terminal of the first switch to connect to the normally open terminal of the first switch and controls the common terminal of the second switch to connect to the normally open terminal of the second switch, thus connecting the first data pin of the charge port to the power pin of the charge port and connecting the second data pin of the charge port to the ground pin of the charge port.

6. The charger according to claim 1, wherein the controller is further configured to cut off the connection between the first data pin and the power pin and cut off the connection between the second data pin and the ground pin, when the charge port and the electronic device is disconnected or the electronic device is fully charged.

7. The charger according to claim 1, further comprising a power control circuit connected to the controller, when the handshake between the electronic device and the charger is created successfully, the controller further controls the power control circuit to enhance current output to short-circuited first data pin and the power pin, and enhance the current output to the short-circuited second data pin and the ground pin.

8. The charger according to claim 1, further comprising a power control circuit connected to the controller, when the handshake between the electronic device and the charger is created successfully, the controller further controls the power control circuit to enhance voltages output to short-circuited first data pin and the power pin, and enhance the voltages output to the short-circuited second data pin and the ground pin.

9. An electronic device, comprising:
   a power port, comprising a power pin, a first data pin, a second data pin, and a ground pin, the first data pin being always disconnected from the second data pin, the power port being configured to connect to a charger;
   a processor, connected to the first data pin and the second data pin;
   a connection switching circuit, connected to the power pin, the first data pin, the second data pin, and the ground pin, and the processor;
   wherein, the processor is configured to initiate a handshake between the electronic device and the charger when the power port connects to the a charge port of the charger, and control the connection switching circuit to connect the first data pin to the power pin and connect the second data pin to the ground pin when the handshake between the electronic device and the charger is created successfully.

10. The electronic device according to claim 9, wherein the connection switching circuit comprises a first switch and a second switch; each of the first switch and the second switch comprises a common terminal, a normally closed terminal, and a normally open terminal; the common terminal of the first switch is connected to the first data pin of the power port, the normally closed terminal of the first switch is connected to the processor, and the normally open terminal of the first switch is connected to the power pin of the power port; the common terminal of the second switch is connected to the second data pin of the power port, the normally closed terminal of the second switch is connected to the processor, and the normally open terminal of the second switch is connected to the ground pin of the power port; initially, the common terminals of the first switch and the second switch are respectively connected to the normally closed terminals of the first switch and the second switch; when the handshake between the electronic device and the charger is created successfully, the processor controls the common terminal of the first switch to connect to the normally open terminal of the first switch and controls the common terminal of the second switch to connect to the normally open terminal of the second switch, thus connecting the first data pin of the power port to the power pin of the charge port and connecting the second data pin of the power port to the ground pin of the power port.

11. The electronic device according to claim 9, wherein the processor further triggers a third data pin of the charge port to connect to a second power pin of the charge port and triggers a fourth data pin of the charge port to connect to a second ground pin of the charge port when the handshake between the electronic device and the charger is created successfully.

12. The electronic device according to claim 9, wherein the processor initiates the handshake between the electronic device and the charger comprises: the processor sends a handshake request signal to the charger via the first data pin and/or the second data pin, and receives a handshake confirm signal sent back from the charger who responses the handshake request signal, via the first data pin and/or the second data pin; the processor determines the handshake between the electronic device and the charger is created successfully when receiving the handshake confirm signal.

13. The electronic device according to claim 12, wherein the handshake request signal is a first preset pulse signal, and the handshake confirm signal is a second preset pulse signal, wherein the first preset pulse signal and the second preset pulse signal both are ten continuous pulses, and a cycle of each pulse is 20 milliseconds, a duty ratio of each pulse is 50%.

14. The electronic device according to claim 12, wherein the processor further sends a charge request to the charger when receiving the handshake confirm signal to inform the charger to connect a third data pin of the charge to the power pin of the charge and connect the fourth data pin of the charge to the ground pin of the charge.

15. The electronic device according to claim 12, wherein the electronic device further comprises a charge management unit and a battery, the charge management unit is connected to the power port and the battery, and is configured to receive power energy provided by the charger from the power port, and convert the power energy to a suitable charge voltage or a suitable charge current to charge the battery.

16. The electronic device according to claim 15, wherein the charge management unit comprises a first charge management unit and a second charge management unit, the first charge management unit and the second charge management unit are both connected to the power pin and the ground pin of the power port, an input current received from the power pin and the ground pin are shunted to two shunt current, and the two shunt current are respectively transmitted to the first charge management unit and the second charge management unit; the first charge management unit and the second charge management unit both are connected to the battery, and output current output from the first charge management unit and the second charge management unit are combined into a joint current to charge the battery.

17. A charging method, configured for charging an electronic device by using a charger, the charging method comprising:

initiating a handshake between the electronic device and the charger when the electronic device is connected to the charger via a charge cable;

controlling a first data pin of a power port of the electronic device to connect to a first power pin of the power port of the electronic device and controlling a second data pin of the power port of the electronic device to connect to a first ground pin of the power port of the electronic device after the handshake between the electronic device and the charger is created successfully; and controlling a third data pin of a charge port of the charger to connect to a second power pin of the charge port of the charger and controlling a fourth data pin of the charge port of the charger to connect to a second ground pin of the charge port of the charger after the handshake between the electronic device and the charger is created successfully, wherein the third data pin is always disconnected to the fourth data pin.

18. The charging method according to claim 17, wherein the electronic device further comprises a first connection switching circuit connected between the first power pin, the first data pin, the second data pin, and the first ground pin of the power port, the electronic device further comprises a second connection switching circuit connected between the second power pin, the third data pin, the fourth data pin, and the second ground pin of the charge port;

the step of controlling a first data pin of a power port of the electronic device to connect to a first power pin of the power port of the electronic device and controlling a second data pin of the power port of the electronic device to connect to a first ground pin of the power port of the electronic device, comprising:

controlling the first connection switching circuit to connect the first data pin of a power port of the electronic device to the first power pin of the power port of the electronic device and controlling the first connection switching circuit to connect the second data pin of the power port of the electronic device to the first ground pin of the power port of the electronic device;

the step of controlling a third data pin of a charge port of the charger to connect to a second power pin of the charge port of the charger and controlling a fourth data pin of the charge port of the charger to connect to a second ground pin of the charge port of the charger, comprising:

controlling the second connection switching circuit to connect the third data pin of the charge port of the charger to the second power pin of the charge port of the charger and controlling the second connection switching circuit to connect the fourth data pin of the charge port of the charger to the second ground pin of the charge port of the charger.

19. The charging method according to any one of claims 18, wherein the step of initiating a handshake between the electronic device, comprising:

sending a handshake request signal from the electronic device to the charger via the charge cable;

sending back a handshake confirm signal from the charger to the electronic device via the charge cable;

wherein, the charger determines the handshake between the electronic device and the charger is created successfully when receiving the handshake request signal; and the electronic device determines the handshake between the electronic device and the charger is created successfully when receiving the handshake confirm signal.

20. The charging method according to claim 18, wherein the step of initiating a handshake between the electronic device, comprising:

sending a handshake request signal from the electronic device to the charger via the charge cable;

sending back a handshake confirm signal from the charger to the electronic device via the charge cable;

sending back a charge request signal from the electronic device to the charger via the charge cable;

wherein, the electronic device determines the handshake between the electronic device and the charger is created successfully when receiving the handshake confirm signal, the charger determines the handshake between the electronic device and the charger is created successfully when receiving the charge request signal.

21. The charging method according to claim 19, wherein the handshake request signal and the handshake confirm signal both are ten continuous pulses, and a cycle of each pulse is 20 milliseconds, a duty ratio of each pulse is 50%.

22. The charging method according to claim 17, further comprising:

enhancing a voltage output from the charge to the electronic device after the third data pin of the charge port of the charger is connected to the second power pin of the charge port of the charger and the fourth data pin of the charge port of the charger is connected to the second ground pin of the charge port of the charger.

* * * * *